INVENTOR.
Herbert P. Schluter

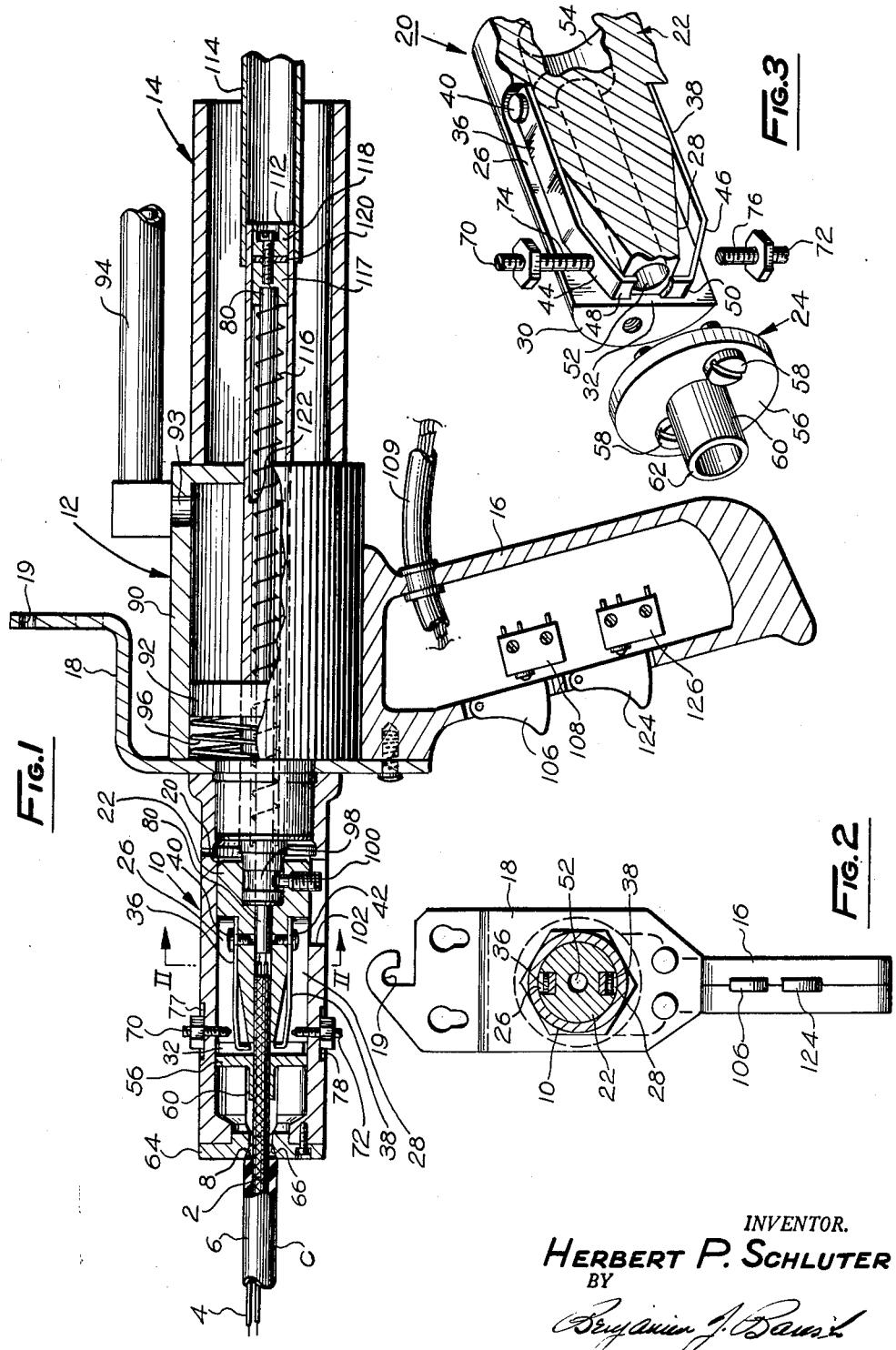

United States Patent Office 3,089,367
Patented May 14, 1963

3,089,367
DEVICE FOR REMOVING COVERINGS FROM ELONGATED ARTICLES
Herbert P. Schluter, Baldwin, N.Y., assignor, by mesne assignments, to Burroughs Corporation, Detroit, Mich., a corporation of Michigan
Filed July 8, 1960, Ser. No. 41,633
7 Claims. (Cl. 81—9.5)

The present invention relates to devices for removing coverings from elongated articles. It is herein described with respect to a tool for removing or stripping a portion of the metal braid covering from the end of a cable, which represents a preferred embodiment of the invention.

A broad object of the invention is to provide a device of the foregoing nature, particularly a cable stripping tool, which is fast and efficient in operation and which is sufficiently compact in construction that it may conveniently be incorporated in portable equipment.

A further object of the invention is to provide a cable stripping device or the like which is conveniently adaptable for cutting a wide range of lengths of the covering from the cable.

Another object of the invention is to provide a cable stripping device or the like which will not damage the cable insulation or other layers underlying the covering to be stripped.

A still further object of the present invention is to provide a cable stripping device or the like which includes means for quickly ejecting the covering that has been cut from the cable.

These and other objects, which will become readily apparent as the description proceeds, are attainable by the present invention. In general, the invention is characterized by the provision of means engageable with the covering to be stripped for moving the covering in a direction parallel to its longitudinal axis relative to its underlying layer to cause the covering to bulge, or to form a ripple, and means for cutting the covering at the bulged or rippled portion. In this manner, the covering need be moved only a slight amount, sufficient to enlarge its diameter at the point where it is to be cut, which may be almost any place along its length. The invention further provides novel structure for quickly and efficiently bulging the covering, cutting the covering at the bulged portion, and ejecting the cut covering.

The novel features of the invention are set forth in the appended claims but the invention itself will be best understood by the description of a cable stripping tool set forth below representing an illustrative but preferred embodiment of the invention.

In the drawings:

FIG. 1 is a longitudinal section view of a braid stripping tool embodying the invention;

FIG. 2 is a front plan view of the stripping tool of FIG. 1, this figure being on a reduced scale and partly in section along lines II—II of FIG. 1;

FIG. 3 is a perspective view, partly in section, of a piston assembly used in the tool of FIGS. 1 and 2, and showing the cutting unit carried by that assembly;

Figure 4:
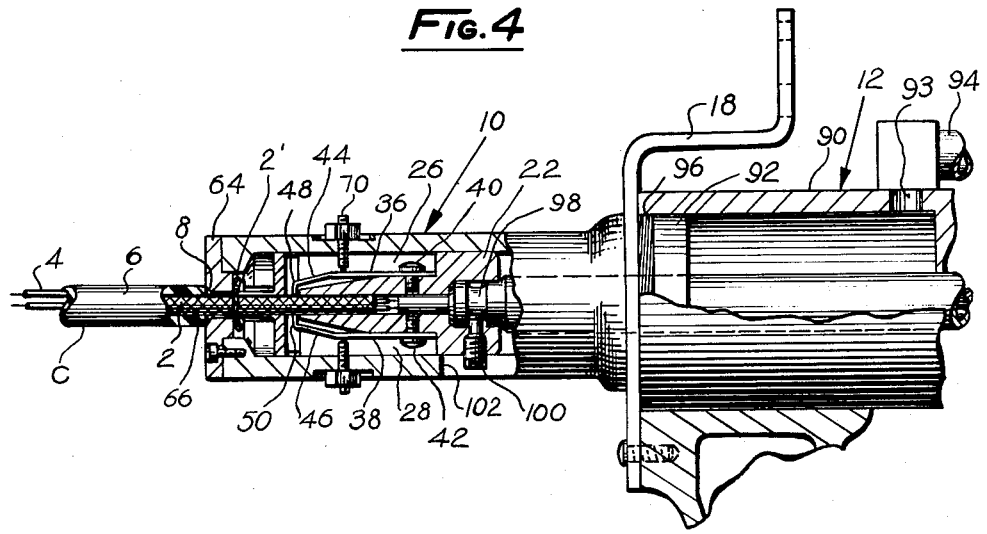
FIG. 4 is a longitudinal sectional view of a part of the braid stripping tool and illustrates the elements in the positions they occupy at the time the braid covering is being cut from the cable.

The tool illustrated is adapted for stripping the end of a metal braid 2 from a cable C preparatory, for example, to applying a connector to the stripped end. The cable illustrated includes a number of insulated conductors 4 within the braid 2, and an outer insulating layer 6 which is stripped beforehand by separate and well known devices, forming a flat annular shoulder or abutting surface 8.

As illustrated in FIG. 1, the tool housing is formed with a longitudinally extending chamber and includes a tubular section generally identified as 10 which accommodates the elements for cutting and ejecting the braid 2, another tubular section generally identified as 12 for accommodating the drive for the cutting elements, and a further tubular section generally identified as 14 for accommodating the drive for the ejecting elements. Handle 16 supports the foregoing sections in a portable manner and also supports electrical switches for controlling the operation of the device. As can be readily seen in FIG. 1, handle 16 is designed as a pistol grip to enable the tool to be more easily grasped and handled as a portable device. A strap 18 is secured between sections 10 and 12 and serves to support the tool when bench mounted or suspended from a line or the like receivable in a hook 19 of the strap when the tool is not in use.

Housing section 10 slidably receives a piston assembly, generally designated as 20 and illustrated particularly in FIG 3, which supports the elements for cutting the braid to be removed. Piston assembly 20 comprises a cylindrical piston head 22 and a cutting or punching head 24, the two being fastened together so that they may be moved within tubular section 10 in unison. Piston head 22 is further formed with longitudinally extending, diametrically opposed recesses 26 and 28, which taper toward each other and terminate in a flat face 30 of the piston head. A slot 32 extending diametrically across the face 30 of the piston head 22 joins the two recesses 26 and 28.

In each recess 26 and 28 is disposed a resilient metal finger 36, 38 secured by fasteners 40, 42. Fingers 36 and 38 taper slightly toward each other for part of their length, intermediate parts 44, 46, and terminate in radially extending ends 48, 50 disposed in slot 32 and adapted to engage the cable, as will be described below. Piston head 22 is further formed with a longitudinally extending opening 52 terminating in a counterbore 54 at the end opposite to flat face 30.

The cutting or punching head 24 is fastened to flat face 30 of the piston head and comprises a disk 56 secured to face 30 by fasteners 58, and an annular cutting or punching unit 60 having an annular cutting edge 62. Cutting unit 60 is supported coaxially with respect to the longitudinally extending opening 52 of the piston assembly 20 and is juxtapositionable about the cable when inserted in the tool. That is, it encompasses the braid 2 but is preferably slightly spaced therefrom so as not to interfere with the braid as it is moved therealong unless and until the braid is bulged, as to be described.

As can be seen in FIG. 1, piston assembly 20 is received within housing section 10 with the annular cutting edge 62 disposed toward the front of the tool and with the piston head 22, particularly the counterbored opening 54, disposed toward the rear. The front end of housing section 10 is closed by closure or end plate 64 having a chamfered central aperture or opening 66 adapted to receive the cable C. Opening 66 of plate 64 serves as the stationary cutting die, in cooperation with annular cutting edge 62, to cut the metal braid 2 to be removed from the cable.

Housing section 10 further supports a pair of oppositely disposed pins 70, 72 in a position overlying fingers 36 and 38 and adapted to engage these fingers when the piston assembly 20 is moved in a forward direction. The pins 70 and 72 are normally disposed out of engagement with the fingers, but upon reciprocation of piston assembly 20, they bear on the tapered portions 44, 46 of the fingers to cause their ends 48 and 50 to engage the cable, that is, the braid 2 of the cable passing through opening 52 of the piston assembly. It is seen that, when the tool is operated to move piston assembly 20 forwardly toward plate 64, pins 70 and 72 are operative in response to relative movement between piston assembly 20 and housing 10 to cause fingers 36 and 38 to move radially into engagement with the cable braid 2, such that the braid is gripped by the fingers, but the underlying layers are not. Thus, fingers 36 and 38 will engage the braid 2 and tend to push it back with respect to its underlying layers. Shoulder 8 of the cable insulation, abutting and held against end plate 64 by the operator, will tend to retain the cable in position. Since the cable is not permitted to back out of the tool and the braid outside the tool is not permitted to move, this will cause the braid 2 within the tool to bulge at the junction between the movable and immovable parts of the braid. The only point where this may occur is between the annular cutting edge 62 of head 24 and the opening 66 of end plate 64, i.e. at 2′, FIG. 4.

Continued movement of the piston assembly 20 will carry with it the cutting head 24 until the cutting edge 62 abuts against the die edge of opening 66 to sever the bulged part of the braid 2.

Pins 70 and 72 are adjustably supported, radially by their threads 74, 76 and longitudinally by slots 77, 78 in housing section 10, so as to cause finger 36 and 38 to engage the braid at the proper point in the movement of piston assembly 20 and with sufficient force to cause the bulging effect in the braid without interfering with or damaging the underlying insulation layers of the cable. It will be appreciated that this bulging effect can be produced almost any place along the length of the cable with only a relatively small amount of movement of the braid with respect to the cable.

Figure 5:
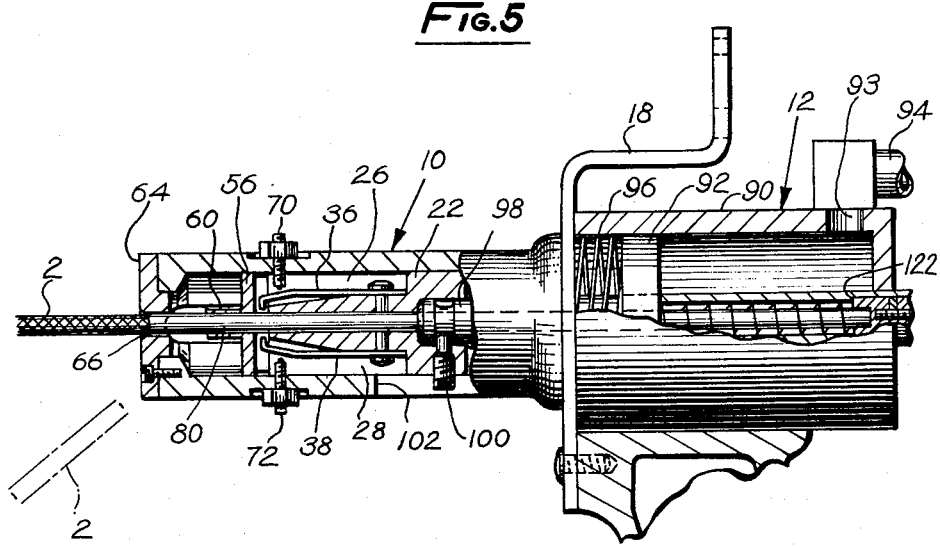
FIG. 5 is a longitudinal sectional view similar to FIG. 4 but illustrating the parts in the positions they occupy at the time the cut braid is ejected from the tool.

The stripping tool illustrated also includes means for ejecting the severed braid, this means comprising the ejector pin 80 disposed within the longitudinally extending opening 52 of the piston assembly 20. Normally, ejector pin 80 is in its retracted position within the tool, as shown in FIG. 1, but after the bulged part of the braid has been severed, the ejector pin is actuated to eject the severed part from the tool through opening 66 of the plate 64, as shown in FIG. 5. The ejector pin moves independently of the piston assembly 20 and has separate means for actuating it, as will be described more fully below.

The means for driving the piston assembly 20 is supported within housing section 12, and comprises an air cylinder 90 of any suitable construction. For purposes of the present description, this air cylinder is schematically shown as comprising a piston 92 within the cylinder, an air intake 93 supplied by an air conduit 94 for driving the piston, and a spring 96 for returning the piston. Piston 92 is secured to a link 98 which is received in the counterbored end of piston head 22 and fastened thereto by a set screw 100. It is thus seen that actuation of the air cylinder will drive piston 92 in a forward direction, that is toward the cable-receiving opening 66 of end plate 64, thereby driving the piston assembly 20 in the same direction, and that upon de-actuation of the air cylinder, piston 92 is returned by spring 96, thereby restoring all the foregoing elements to their normal positions. Housing section 10 is slotted at 102 to accommodate the set screw 100 and to enforce a rectilinear reciprocating movement of the foregoing elements when the air cylinder 90 is actuated.

For controlling the actuation of the air cylinder, the handle 16 is provided with a trigger 106 capable to actuate a switch 108 connected, for example, through conductors 109 to actuate a solenoid-controlled valve (not shown) for the air supply to conduit 94.

Any suitable means may also be used for actuating the ejector pin 80. For this purpose, the stripping tool illustrated comprises an air cylinder 110 received within air cylinder 90 and having a piston 112. The air for driving piston 112 is supplied from conduit 114, and the return of the piston is effected by a return spring 116 disposed within the cylinder 110. Ejector pin 80 is fastened to the piston head 112 which comprises a pair of brass fittings 117, 118 separated by a leather washer 120. Air cylinder 110 is internally formed with an annular shoulder 122 which limits the forward movement of piston 112, and thereby, the forward movement of the ejector pin 80.

In operation, a cable whose end is to be stripped of the metal braid 2 is inserted through opening 66 of closure plate 64 until the shoulder 8 formed by stripping the outer insulating layer abuts against the closure plate. This is shown in FIG. 1. The operator then operates trigger 106 which actuates switch 108 to open the air valve to conduit 94 moving piston 92 of the air cylinder 90 in a forward direction. This causes the piston assembly 20 to also move in a forward direction. As the spring fingers 36, 38 impinge on pins 70, 72, the latter flex the fingers into engagement with the braid covering 2 of the cable C and, as the piston assembly moves further, cause the braid to bulge (2′) as shown in FIG. 4. Still further movement of the piston assembly 20 causes the cutting edges 62 of the movable cutting head 24 to abut against the stationary die opening 66 of plate 64, with the bulged 2′ part of the braid 2 therebetween, thus severing the braid. The cable is then withdrawn from the tool, and trigger 124 is then operated to actuate switch 126 to control the air supply to conduit 114 to move piston 112 forwardly until it abuts against shoulder 122. Ejector pin 80 carried by the piston is thus moved forwardly through the opening 52 of the piston assembly 20 and ejects the severed braid 2 from the tool as illustrated in FIG. 5.

After each of these operations, namely the cutting operation controlled by trigger 106 and the ejecting operation controlled by trigger 124, release of the respective triggers will permit their mechanisms to restore to their normal positions by return spring 96 for air cylinder 90 and by return spring 116 for air cylinder 110.

While there has been shown a preferred embodiment of the invention in the form of a normally operated portable tool, it will be understood that the invention and/or various features thereof could be embodied in more automatic equipment, since the invention is susceptible to varying degrees of automatic control. Many other applications and variations will be obvious to those skilled in the art coming within the true spirit and scope of the invention as defined in the following claims.

What is claimed is:

1. A tool for stripping a part of a covering from a cable, comprising: a housing closed at one end by a closure plate having an opening for the reception of one end of the cable to be stripped; a piston assembly slidably received within said housing and formed with a longitudinally extending opening in alignment with the opening of said closure plate for the reception of said cable; said piston assembly comprising a plurality of fingers normally spaced from the cable but movable to engage the covering of said cable; said piston assembly further including an annular cutting member coaxial with the longitudinal opening of said piston assembly and juxtapositionable about said cable when received in said housing; means for moving said piston assembly in a direction bringing said cutting member towards said closure plate; and means for moving said fingers to engage the cable covering during the movement of the piston assembly, causing said cable covering to bulge between the cutting member and the closure plate whereby said bulged portion will be caught between and severed by said annular cutting member and said closure plate.

2. A tool for stripping a part of a covering from a cable, comprising: a housing closed at one end by a closure plate having an opening for the reception of one end of the cable to be stripped; a piston assembly slidably received within said housing and formed with a longitudinally extending opening in alignment with the opening of said closure plate for the reception of said cable; said piston assembly comprising a plurality of fingers normally spaced from the cable but movable to engage the covering of said cable; said piston assembly further including an annular cutting member coaxial with the longitudinal opening of said piston assembly and juxtapositionable about said cable when received in said housing; means for moving said piston assembly in a direction bringing said cutting member towards said closure plate; means for moving said fingers to engage the cable covering during the movement of the piston assembly causing said cable covering to bulge between the cutting member and the closure plate whereby said bulged portion will be caught between and severed by said annular cutting member and said closure plate; and an ejector pin movable within the longitudinal opening of said piston assembly for ejecting said severed cover.

3. A tool for stripping a part of a covering from a cable, comprising: a housing carrying at one end thereof a plate having an opening for the reception of one end of the cable to be stripped; a piston assembly slidably received within said housing and formed with a longitudinally extending opening in alignment with the opening of said plate for the reception of said cable; said piston assembly being formed with a plurality of longitudinally extending recesses; a plurality of fingers disposed in said recesses and normally spaced from the cable but movable to engage the covering of said cable; said piston assembly further including an annular cutting member coaxial with the longitudinal opening of said piston assembly and juxtapositionable about said cable when received in said housing; means for moving said piston assembly in a direction bringing said cutting member towards said plate; and means carried by said housing for moving said fingers to engage the cable covering during the movement of the piston assembly, causing said cable covering to bulge between the cutting member and the plate whereby said bulged portion will be caught between and severed by said annular cutting member and said plate.

4. A portable tool for cutting an end portion of the covering of an elongated article, comprising: a housing formed with a longitudinally extending chamber; a handle for supporting said housing in a portable manner; a plate closing one end of said housing; said plate being formed with an aperture in alignment with said housing chamber, the end of the elongated article to be stripped being receivable through said apertured plate into said chamber; an air cylinder carried by said housing; a piston assembly disposed within said air cylinder and movable through said chamber toward and away from said end plate; a cutting element carried by said piston assembly and having an annular cutting edge of a diameter to closely surround the covering of said elongated article when received in said housing; control means carried by said handle for actuating said air cylinder and said piston assembly to move said cutting element toward said end plate; and means for bulging the covering of the elongated article between said end plate and the cutting edge of said cutting element, whereby the latter will cut said covering where bulged when said cutting element is moved toward said end plate.

5. A device for stripping away an end portion of the covering of an elongated article, comprising: a housing formed with a longitudinally extending chamber; a plate closing one end of said housing; said plate being formed with an aperture in alignment with said housing chamber, the end of the elongated article to be stripped being receivable through said apertured plate into said chamber; a piston assembly disposed within said chamber and movable therethrough toward and away from said end plate; a cutting element carried by said piston assembly and having an annular cutting edge of a diameter to closely surround the covering of said elongated article when received in said housing; first power means for moving said piston assembly and thereby said cutting element toward said end plate; means for bulging the covering of the elongated article between said end plate and the cutting edge of said cutting element, whereby the latter will cut said covering where bulged when said cutting element is moved toward said end plate; a pin disposed within said piston assembly and movable toward and away from said apertured plate for ejecting the cut end of the covering; second power means connected to said pin for moving same; and control means for selectively actuating said first and second power means.

6. In a device for removing a portion of a covering from an underlying layer of an elongated article, a member movably mounted parallel to the longitudinal axis of said article, a plurality of resilient fingers carried by said movable member and normally spaced radially from said covering, means disposed in the path of movement of said fingers for flexing same into engagement with said covering such that said covering is gripped thereby but the underlying layer is not, thereby to cause said covering to bulge as said member is moved parallel to the longitudinal axis of said article, and cutting means for cutting said covering at the bulged portion thereof.

7. A device for removing a portion of the covering from an underlying layer of an elongated article, comprising, a first member including means for engaging said elongated article at a first point of said covering, a second member including means for engaging said covering at a second point thereof, means permitting relative movement with respect to said first and second members for bringing them toward each other, the cover engaging means of said second member comprising a plurality of fingers normally spaced radially from said elongated covering but movable into engagement with said covering, means operative in response to relative movement between said first and second members to engage said fingers and to cause said fingers to move radially into engagement with said covering such that said covering is gripped thereby but the underlying layer is not, thereby to cause said covering to bulge between said first and second points thereof, and cutting means for cutting said covering at the bulged portion thereof.

References Cited in the file of this patent

UNITED STATES PATENTS

| | | |
|---|---|---|
| 1,801,278 | Knuuti | Apr. 21, 1931 |
| 2,239,755 | Montgomery | Apr. 29, 1941 |
| 2,878,700 | Reynolds | Mar. 24, 1959 |
| 2,884,825 | Eubanks | May 5, 1959 |
| 2,885,764 | Shulters et al. | May 12, 1959 |
| 2,920,513 | Baird et al. | Jan. 12, 1960 |
| 2,929,285 | Gulemi | Mar. 22, 1960 |
| 2,988,940 | Folkenroth et al. | June 20, 1961 |
| 2,996,939 | Meier | Aug. 22, 1961 |
| 3,044,333 | Broske | July 17, 1962 |
| 3,044,334 | Broske | Dec. 31, 1962 |